Aug. 26, 1930.     S. COOPER     1,774,354
TEA MEASURING MACHINE
Original Filed Sept. 1, 1921     4 Sheets-Sheet 1
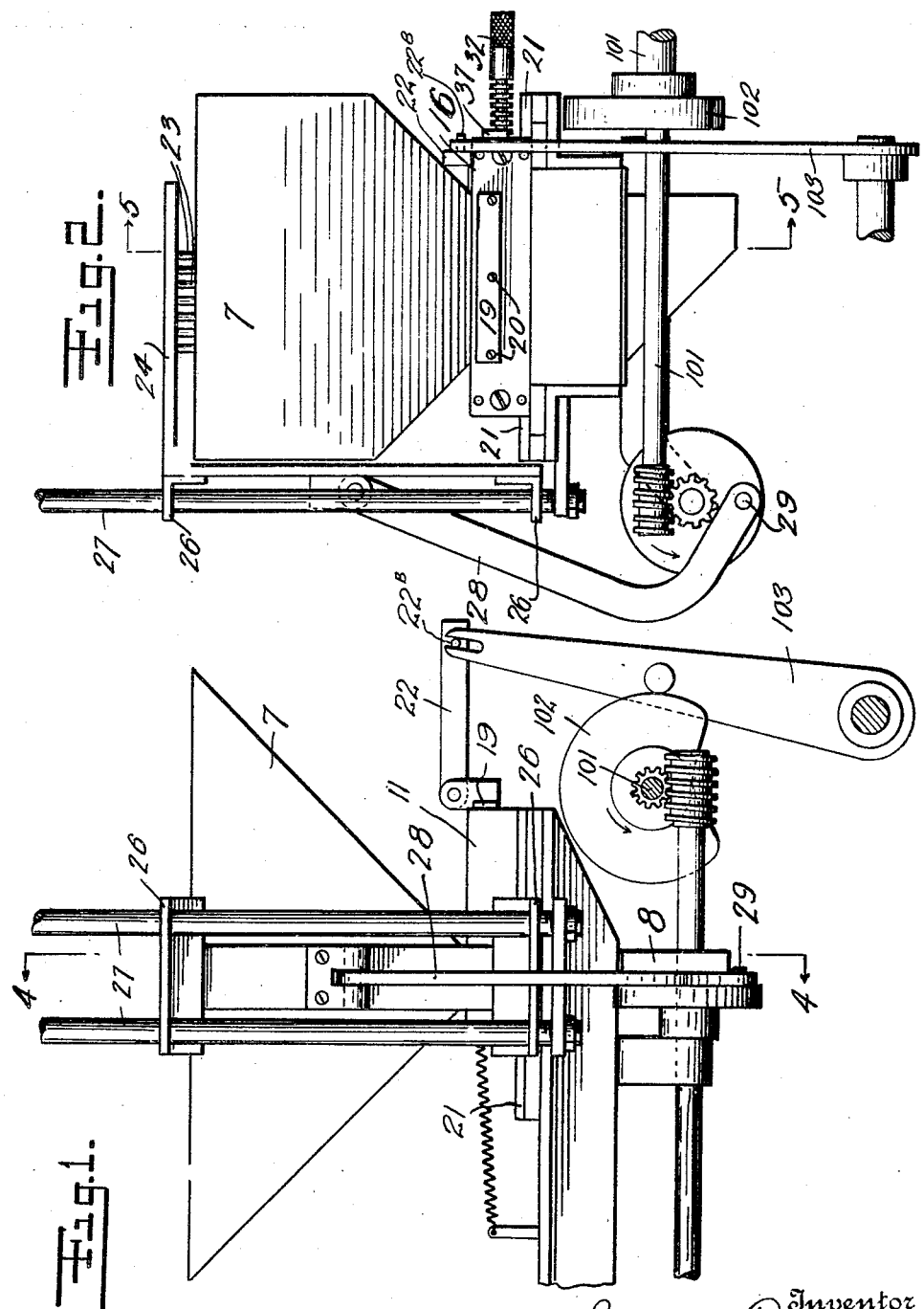
Inventor
Simon Cooper
By his Attorney
Frank J. Kent Aug. 26, 1930.                S. COOPER                1,774,354
                         TEA MEASURING MACHINE
              Original Filed Sept. 1, 1921    4 Sheets-Sheet 2
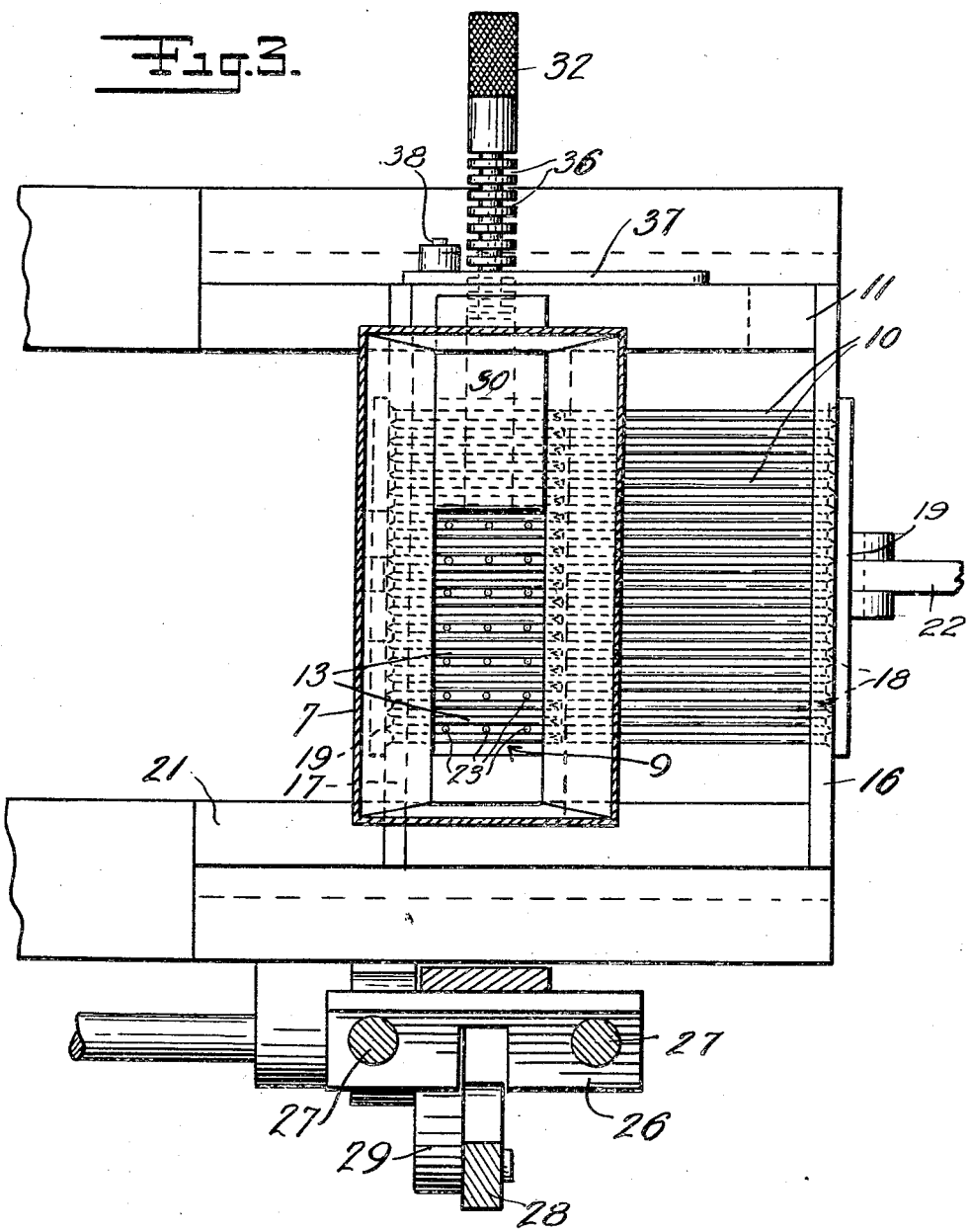

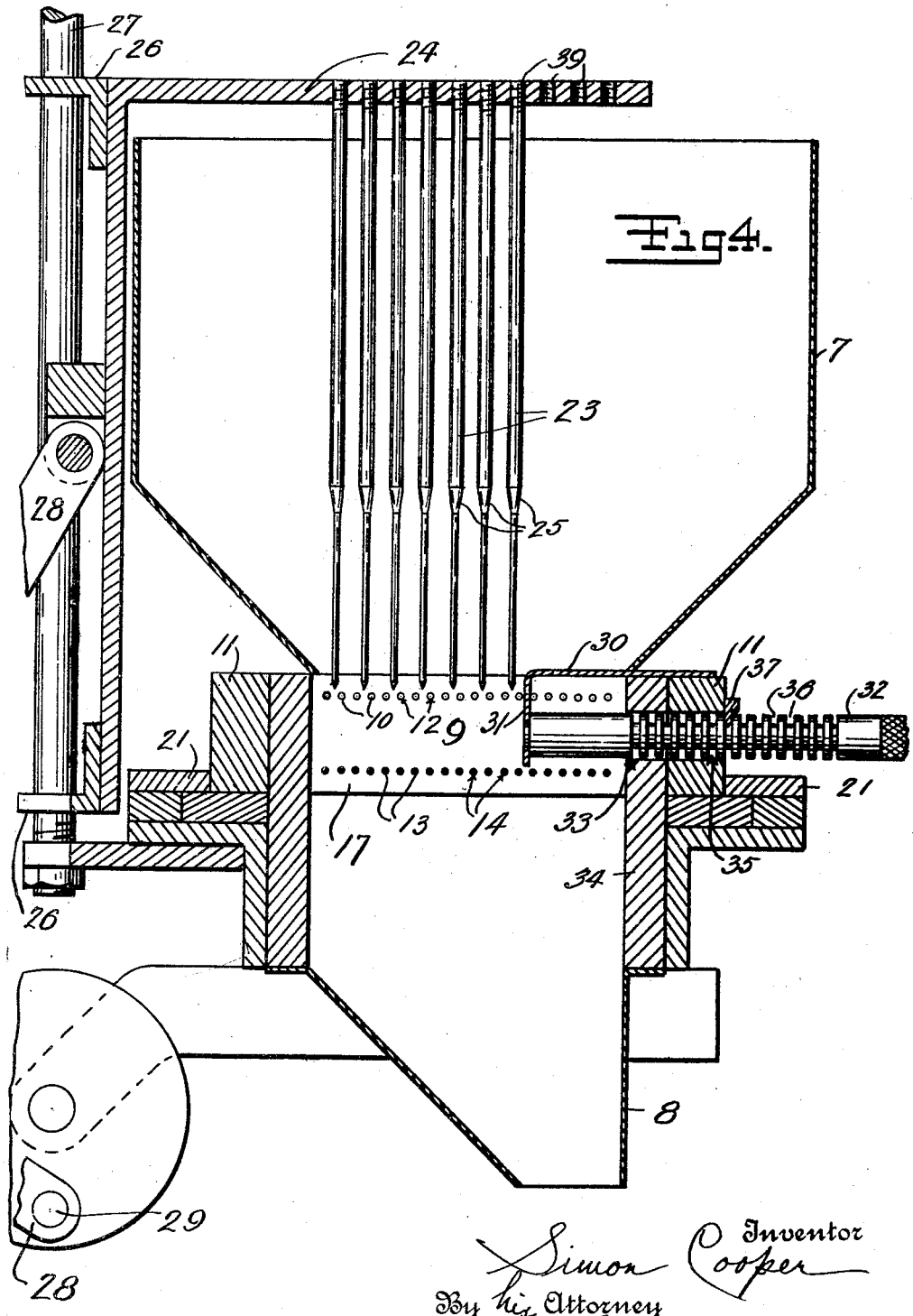

Aug. 26, 1930.　　　　S. COOPER　　　　1,774,354
TEA MEASURING MACHINE
Original Filed Sept. 1, 1921　　4 Sheets-Sheet 4
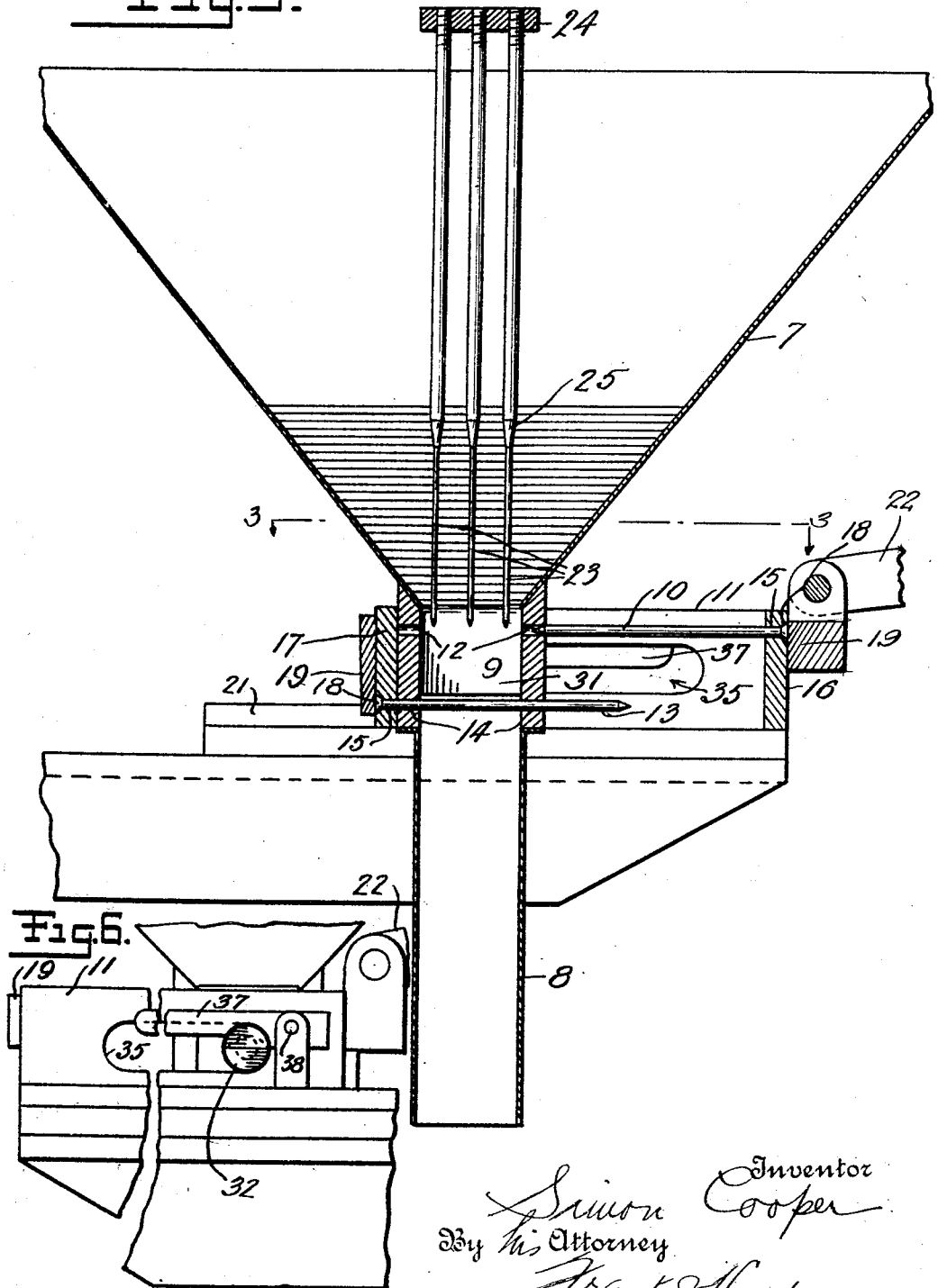

Patented Aug. 26, 1930

1,774,354

UNITED STATES PATENT OFFICE

SIMON COOPER, OF BROOKLYN, NEW YORK, ASSIGNOR TO COOPER TEA PACKET CO., INC., OF BROOKLYN, NEW YORK, A CORPORATION OF NEW YORK

TEA-MEASURING MACHINE

Application filed September 1, 1921, Serial No. 497,769. Renewed January 21, 1930.

The general objects of the present invention are to provide simple and practical apparatus for measuring out tea in relatively small quantities such as used in the familiar muslin "tea bag".

The dried tea leaves because of their irregular size and shape and their light weight are particularly difficult of measurement, especially in the small quantities mentioned, and further special objects of the invention are to overcome these difficulties and in such a way as to obtain rapid, accurate measurement.

Another special object of the invention is to provide simple and practical means for adjusting the machine to measure different quantities of material.

These objects are attained in the apparatus disclosed in the accompanying drawings by means of certain novel features of construction, combinations and relations of parts, as will be pointed out more in detail in the specification following. As these drawings are primarily of an illustrative character, however, it will be understood that the structure may be modified in various respects without departure from the true spirit and scope of the invention; and I further wish it understood that the terms which I have used herein are employed in a descriptive rather than in a limiting sense, except for such limitations as may be required by the prior art.

Figure 1 in the drawings referred to is a side view, and

Figure 2 is a front view of the machine, certain parts being broken away for lack of space in each of these views.

Figure 3 is an enlarged plan and part horizontal sectional view as taken on substantially the plane of line 3—3 of Figure 5.

Figure 4 is a vertical sectional view taken on substantially the plane of line 4—4 of Figure 1.

Figure 5 is a similar view taken on substantially the plane of line 5—5 of Figure 2.

Figure 6 is a broken detail view showing an end elevation of the device shown in Figure 3.

In the machine illustrated, the tea, in bulk, is placed in a hopper 7 and is discharged in measured quantities from the base of this hopper, through a discharge chute 8, into the bags or other containers. The hopper preferably has inclined sides, as shown, so as to cause the material to gravitate into a throat or measuring chamber 9 at the head of the discharge chute.

The measurement of the charge is effected in this chamber between upper and lower oppositely working "grates", illustrated particularly in Figure 5. The upper grate consists of a set of laterally spaced forwardly projecting pointed pins 10 carried by the rear wall of the reciprocating slide 11 and operating through guide openings 12 provided in the opposite side walls of the measuring chamber, and the lower grate consists of a similar series of rearwardly projecting laterally spaced pins 13 carried by the forward end of the slide 11 and operating through guide openings 14 in the opposite side walls of the measuring chamber. The two sets of pins are preferably arranged in overlapping relation, as shown, the extent of overlap being substantially equivalent to the width of the measuring chamber so that the upper grate as it advances will operate as a cut-off valve to close off the hopper before the lower grate is withdrawn far enough to discharge the measured quantity of material caught between the upper and lower grates. The guide openings 12, 14 are slightly larger than the pins to allow particles of tea dust to be pushed through without binding.

This measuring operation will possibly be best understood from Figure 5 where it will be seen that in the position of the grate-like valve members there shown, the lower member will support the body of tea fed down from the hopper into the measuring chamber, and as this member is retracted in the movement of the slide toward the left, the upper member will cut off a measured charge and at the same time provide a support for the body of tea above the same and further that this upper member, by reason of the overlapping relation described, comes into this supporting position before the lower member releases the charge which has thus been measured off.

The pins 10 and 13 of the two horizontal grate elements are shown as removably supported on the slide by being seated in openings 15 provided therefor in the upright, rear and front walls 16, 17 of the slide, said pins having heads 18 at their outer ends set flush in the supports 16, 17 and covered by the holding plates 19, which plates are detachably secured by screws or other suitable fastening devices 20. Upon the removal of these cover plates it will be evident that any one or a number of the pins may be withdrawn. This enables easy replacement of any pins which may become worn or injured.

The slide which carries the two sets of pins operates in suitable guide-ways defined by plates 21 and is reciprocated by any suitable means such as a link 22 connected with a crank (the latter not shown).

Because of the contracted nature of the throat at the entrance to the measuring chamber, the dried tea leaves have a tendency to "bridge" across the foot of the hopper (Figure 5) and thus shut off the flow. To overcome this tendency and insure the proper feeding of the material down into the measuring chamber, without injuring the frail and more or less brittle tea leaves, I provide a feed plunger made up in the illustration of a plurality of pointed pins or prongs 23 dependent from a vertically reciprocating head 24, and operating down through the contracted throat portion of the hopper. These pins are shown in Figures 4 and 5 as more widely spaced than the grate pins, so as to work through the mass and prevent the formation of bridges, without breaking individual leaves. On the down stroke, these plungers exert a feeding tendency and this tendency is increased and made more positive by forming the pins with enlarged shouldered portions 25. These shoulders are shown as of tapered or beveled form so as to slightly compact the mass at this point, above the lower constricted part where the bridges ordinarily would occur. Thus, the long reduced lower end portions of the plunger pins serve to prevent the bridging action, where such action might occur and the shoulders, located above this zone, operate to feed the loose mass down into the measuring compartment.

The reciprocating head of the feed plunger is shown as guided at 26 on the uprights 27 and as actuated by a link 28 connected with a crank disc 29.

The parts are preferably so timed that the feed plunger makes several strokes when the lower discharge grate is in its advanced position supporting the material in the measuring chamber, as shown in Figure 5. This enables the plunger to compact the charge somewhat, thus insuring full equal charges. On the forward stroke of the upper cut-off grate the plunger is retracted, thereby relieving the mass of pressure and enabling the cut-off pins to readily penetrate the loosened body of material.

The above mentioned timing may be obtained by any suitable mechanism. In the form shown, the arm 22 of the horizontal slide is operated by a rocker arm 103 and cam 102 carried by shaft 101, the latter shaft being operated from the shaft driving the arm 28.

The size or quantity of the measured charge is varied in the illustration by means of a gage plate shown at 30 in Figure 4 as slidingly adjustable in the bottom of the hopper, across the throat of the measuring chamber, and having a dependent or downturned inner end portion 31 serving in effect as an adjustable end wall for such chamber. This wall is shown as adjusted by means of a handle rod 32 extending through an opening 33 in the fixed end wall 34 of the throat and received in a slot 35 provided in the side of the slide 11. The gage portion 31 of this plate is, as clearly shown in Figure 4, of less thickness than the space between the cut-off pins so that said pins can pass to opposite sides of the plate irrespective of its adjusted position, and in order that said plate shall always be set in proper position to have the pins pass to opposite sides of the same I have shown the adjusting handle as provided with grooves 36 spaced in accordance with the spacing of the cut-off pins and adapted to receive an adjustable stop shown in the form of a lever 37 pivoted on the supporting base at 38 and adapted to be dropped down into any one of these notches or grooves.

It will be seen that upon lifting the positioning stop 37 the gage plate is free to be shifted either inward or outward, to decrease or increase the size of the measuring chamber and that once the adjustment is made, the parts are secured in the desired relation by simply dropping the stop down into the nearest notch in the shifting handle. The stop is made to fit closely in these notches so as to insure proper positioning of the gage plate and so as to prevent shifting of this plate during operation of the machine.

It is desirable to have the plunger pins extend fully down into the contracted throat of the hopper and to prevent these pins from interfering with the gage plate when the same is adjusted inwardly, I preferably make them readily movable from the reciprocating head which supports them, as by screw-threading their upper ends and detachably engaging them in screw seats provided in the head, as indicated at 39. Figure 4 shows clearly how when the measuring chamber has been shortened, one or any desired number of the plunger pins may be readily removed.

What I claim is:

1. In a machine of the character disclosed, a passage forming a measuring chamber, an upper series of cut-off pins arranged to cross said chamber from one side thereof, a lower series of discharge pins arranged to cross the chamber from the opposite side thereof, a reciprocatory feed element above the cut-off pins adapted to prevent bridging of the material within the measuring chamber and means for simultaneously reciprocating the two sets of pins.

2. The combination of claim 1 in which the inner ends of the two sets of pins stand in overlapping relation substantially equal to the width of the measuring chamber.

3. In combination with the structure of claim 1 in which the feed element consists of a vertically reciprocating feed plunger head having a series of spaced pins operating above the cut-off pins.

4. In a machine of the character disclosed, a passage forming a measuring chamber, an upper series of cut-off pins arranged to cross said chamber from one side thereof, a lower series of discharge pins arranged to cross the chamber from the opposite side thereof, a feed element above the cut-off pins operating to prevent bridging of the material in the measuring chamber, said feed element comprising a vertically reciprocating plunger head having a series of feed pins spaced a greater distance apart than the cut-off pins and means for simultaneously reciprocating the cut-off and discharge pins.

5. The combination of claim 4 in which the feed pins may be varied in number.

6. In a machine of the character disclosed, a measuring chamber having upper and lower guide openings in opposite side walls thereof, a slide frame having a series of spaced cut-off and discharge pins secured in opposite sides of the same operating respectively in the upper and lower guide openings, a gage plate adapted to be positioned between the cut-off pins to vary the capacity of the measuring chamber and means for simultaneously reciprocating said frame and pins.

7. In a machine of the character disclosed, a measuring chamber having upper and lower guide openings in opposite side walls thereof, a slide frame having a series of spaced cut-off and discharge pins secured in opposite sides of the same operating respectively in the upper and lower guide openings, a gage plate positioned between the cut-off pins to vary the capacity of the measuring chamber, means for adjustably securing the gage plate in its desired set position and means for simultaneously reciprocating said frame and pins.

8. In a machine of the character disclosed, a hopper having a discharge chamber in the bottom thereof, vertically reciprocating pin plungers operating in the hopper over said discharge chamber, a cut-off grate consisting of a series of spaced pins operating through one side of the discharge chamber, a discharge grate below the cut-off grate and consisting of a series of spaced pins operating through the opposite side of the discharge chamber, means for causing the two grates to enter the discharge chamber in opposite directions and means for lowering the pin plungers when the lower grate is in advanced position and for lifting the pin plungers as the cut-off grate is advanced.

9. In a machine of the character disclosed, a feed hopper having a discharge throat at the bottom thereof, oppositely working cut-off and discharge elements operating across said discharge throat, a vertically reciprocating plunger head over the hopper and readily removable pins carried by said head and forming plungers cooperating with the discharge throat.

10. The combination of claim 9 in which the plungers have reduced lower end portions and shoulders above such reduced portions for compacting the material in the hopper.

11. In a machine of the character disclosed, a feed hopper provided with a discharge throat, a feed plunger cooperating with said throat and comprising a series of reciprocating spaced pins having reduced lower end portions and enlargements above the same for compacting the material being fed and measured-charge-forming devices operating in the discharge throat.

12. In a machine of the character disclosed, a passage forming a measuring chamber, a slide having end portions disposed externally of and at opposite sides of the measuring chamber, a series of cut-off pins carried by one end portion of the slide and operating through one side of the measuring chamber, a series of discharge pins carried by the opposite end portion of the slide above the first set of pins and operating through the opposite side of the measuring chamber and means for reciprocating said slide.

13. The combination of claim 12 in which the inner ends of the two sets of pins overlap to an extent substantially equal to the width of the measuring chamber and in which the measuring chamber is provided in both sides thereof with guide openings for said pins.

14. The combination of claim 12 in which the pins are supported at their outer ends in the end portions of the slides and are detachably held therein by removable cover plates overstanding the outer ends of the pins.

15. The combination of claim 12 in which one of the walls of the measuring chamber is relatively adjustable and means are provided for securing said adjustable wall in variously adjusted relations and free of the pins aforesaid.

16. In a machine of the character disclosed, a measuring chamber having an adjustable wall for varying the capacity of said chamber and upper and lower reversely operating sets of cut-off and discharge pins operating across the measuring chamber irrespective of the varied adjustments of the wall aforesaid.

17. In a machine of the character disclosed, the combination with a hopper having a discharge throat, a series of spaced pins operating across said discharge throat and a gage plate adjustable in said discharge throat and of a thickness less than the space between adjacent pins to thereby enable said pins to pass to opposite sides of the same.

18. In the combination of claim 17, means for adjusting and securing the gage plate in register with the spaces between the pins.

19. In the combination of claim 17, means for securing the gage plate in register with the spaces between the pins and including a releasible stop and a shifting member for the gage plate having notches engageable by said stop.

20. The structure of claim 1 in which the pins are pointed or tapered to readily work through the material without friction or tendency to break the material.

21. The structure of claim 1 in which said cut-off and discharge pins are pointed, or tapered, and in which the feed element consists of a plunger head having pointed feed pins arranged to reciprocate at an angle to said cut-off and discharge pins.

In testimony whereof I affix my signature.

SIMON COOPER.